(12) United States Patent
Mosher et al.

(10) Patent No.: US 8,718,905 B2
(45) Date of Patent: *May 6, 2014

(54) SUPPLEMENTING ENGINE CONTROL VIA A DIAGNOSTICS PORT

(71) Applicant: 128 Combustion, LLC, Park City, UT (US)

(72) Inventors: Kendall J. Mosher, Fort Collins, CO (US); Chester J. Silvestri, Los Gatos, CA (US); Adam Raper, Park City, UT (US); David R. Emberson, Santa Cruz, CA (US)

(73) Assignee: 128 Combustion, LLC, Park City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,499

(22) Filed: Nov. 11, 2013

(65) Prior Publication Data

US 2014/0067231 A1 Mar. 6, 2014

Related U.S. Application Data

(63) Continuation-in-part of application No. 13/233,599, filed on Sep. 15, 2011.

(60) Provisional application No. 61/865,419, filed on Aug. 13, 2013.

(51) Int. Cl.
*F02D 17/00* (2006.01)

(52) U.S. Cl.
USPC ............. 701/115; 701/99; 701/101; 701/102

(58) Field of Classification Search
CPC . Y02T 10/18; G07C 2205/02; B60W 30/188; B60W 30/1882; F02D 13/00; F02D 13/02; F02D 13/0203; F02D 13/06; F02D 2400/11; F02B 75/041; F02B 75/048; B60Y 2300/435
USPC .......... 701/99, 101, 102, 103, 104, 112, 114, 701/115, 29.1; 702/183; 123/48 R–48 D, 123/198 F
See application file for complete search history.

(56) References Cited

U.S. PATENT DOCUMENTS 7,577,511 B1 8/2009 Tripathi et al.
7,849,835 B2 12/2010 Tripathi et al.
(Continued)

FOREIGN PATENT DOCUMENTS

WO WO 2010/006311 1/2010
WO WO 2011/085383 7/2011

OTHER PUBLICATIONS

DiabloSport Predator, Accessed Feb. 19, 2011, http://shop.diablosportpower.com/DiabloSport-Predator-U7194-2006-2012-GM-Car-Truck-SUV-U7194.htm, http://www.rpmoutlet.com/pdf/update_ford.pdf.*

(Continued)

*Primary Examiner* — Khoi Tran
*Assistant Examiner* — Spencer Patton
(74) *Attorney, Agent, or Firm* — Beyer Law Group LLP

(57) ABSTRACT

A secondary controller for controlling the performance of a moving automobile is described. The secondary controller can be configured to communicate with one or more vehicle controllers, such as the engine control unit, while the automobile is being driven. The secondary controller can send control commands to the vehicle controller to effect the operation of the vehicle's power train. The secondary controller can receive power train related data from the engine control unit and based upon the received power train data determine when to send the control commands. In one embodiment, the secondary controller communicates with the vehicle controller via the vehicle's diagnostic port, such as an OBD-II port. In another embodiment, the secondary controller can be configured to control the operational displacement of a variable displacement engine while the vehicle is driven.

21 Claims, 8 Drawing Sheets

(56) References Cited

U.S. PATENT DOCUMENTS

| | | | |
|---|---|---|---|
| 7,886,715 B2 | 2/2011 | Tripathi et al. | |
| 7,954,474 B2 | 6/2011 | Tripathi et al. | |
| 2010/0006065 A1 | 1/2010 | Tripathi et al. | |
| 2010/0010724 A1 | 1/2010 | Tripathi et al. | |
| 2010/0050986 A1* | 3/2010 | Tripathi et al. | 123/406.23 |
| 2011/0030657 A1 | 2/2011 | Tripathi et al. | |
| 2011/0208405 A1 | 8/2011 | Tripathi et al. | |

OTHER PUBLICATIONS

Genisys EVO User Guide, OTC, Mar. 28, 2011, http://genisysotc.com/pdfs/555302_revc_genisys_evo_2010_manual.pdf.*

Diagnostic Scan Tool—Dodge Diesel—Diesel Truck Resource Forums, Mar. 4, 2008, http://www.dieseltruckresource.com/dev/sitemap/diagnostic-scan-tool-t190545.html.*

Koscher et al., "Experimental Security Analysis of a Modern Automobile", 2010 IEEE Symposium on Security and Privacy, pp. 447-462.*

\* cited by examiner

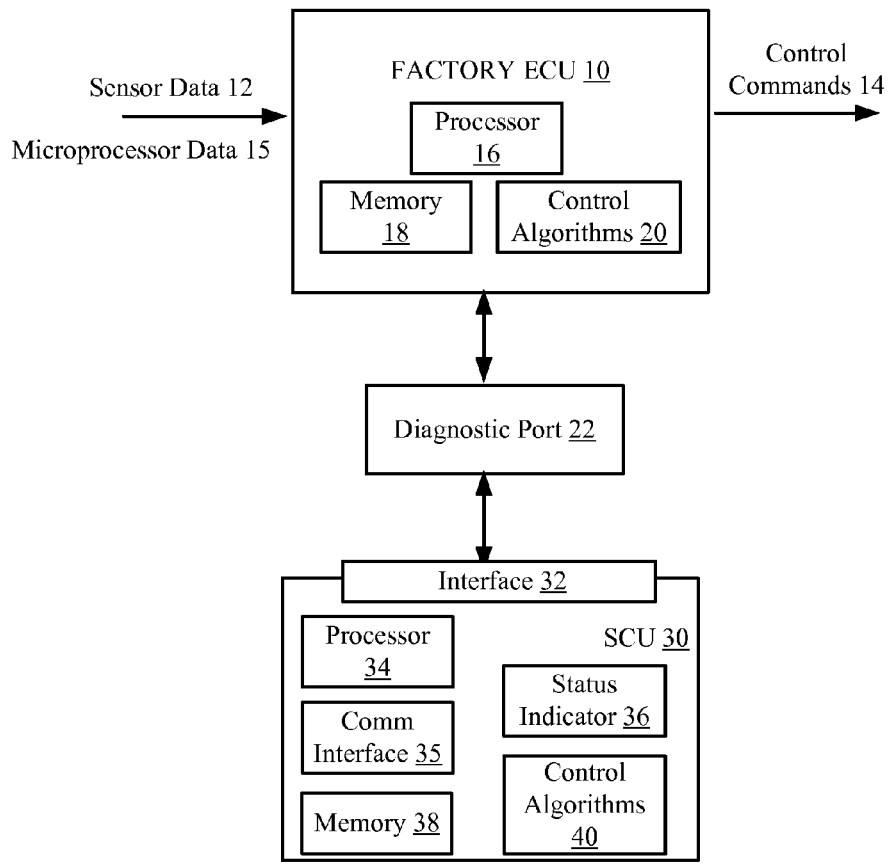
Fig. 1
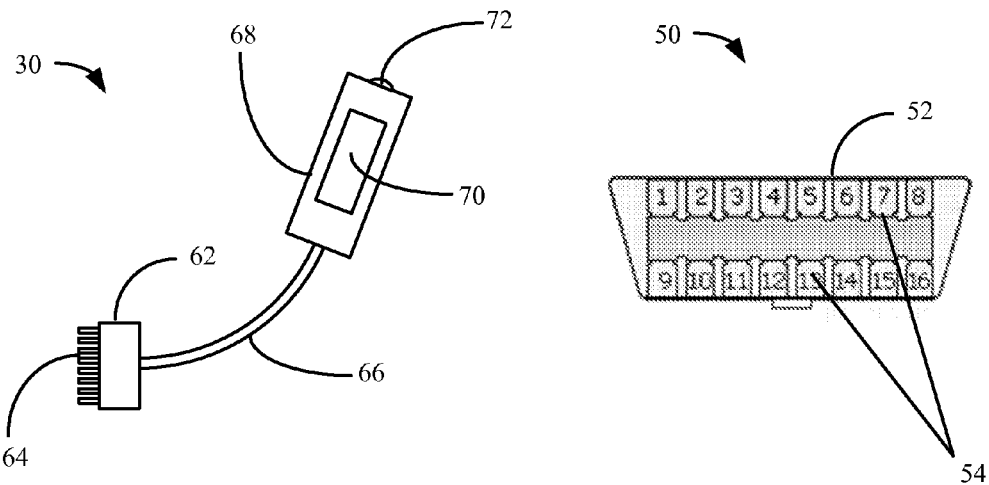
Fig. 2A
Fig. 2B

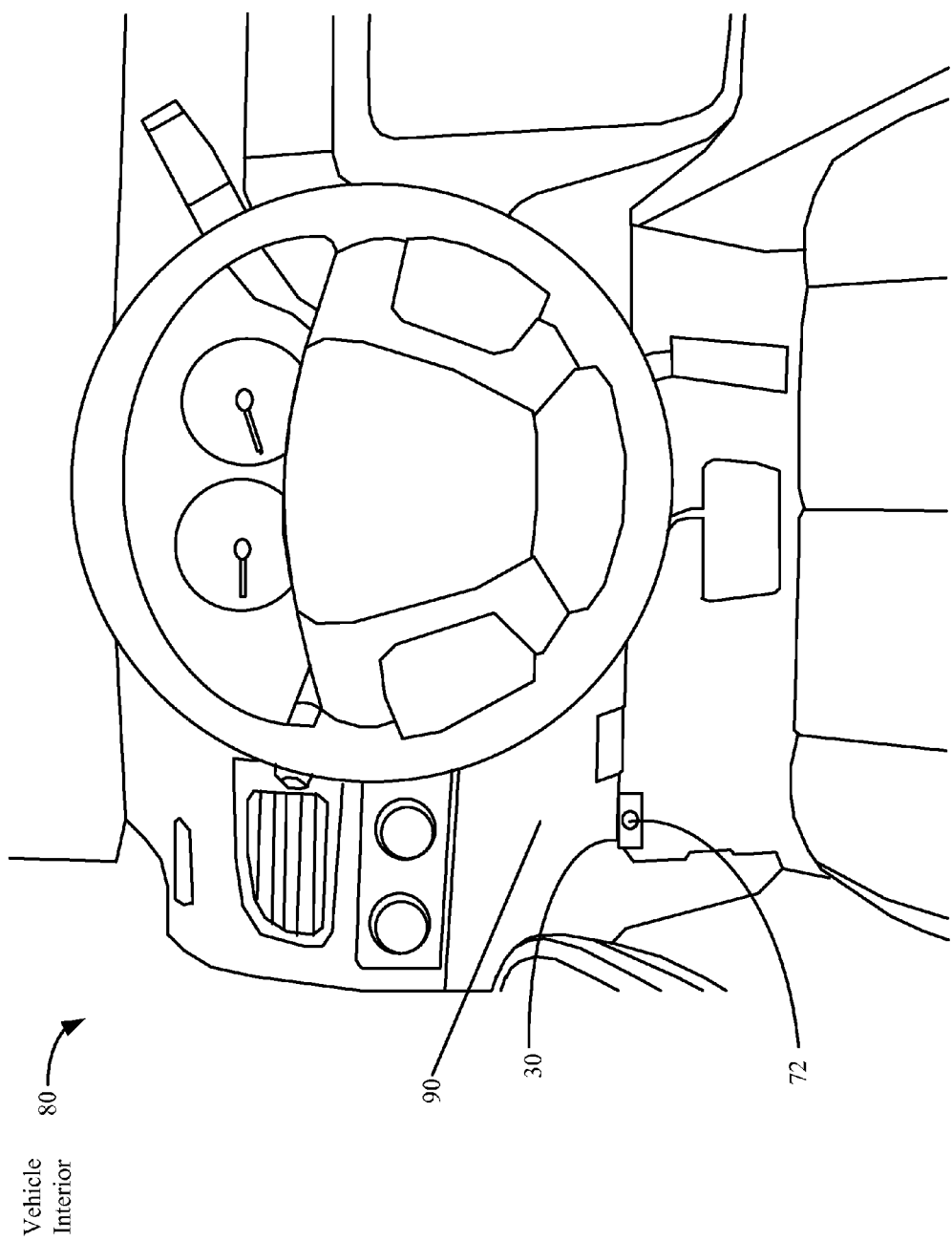

SUPPLEMENTING ENGINE CONTROL VIA A DIAGNOSTICS PORT

CROSS REFERENCE TO RELATED APPLICATIONS

This application claims priority to U.S. Provisional Patent Application No. 61/865,419, filed Aug. 13, 2013, entitled "SUPPLEMENTING ENGINE CONTROL VIA A DIAGNOSTICS PORT" and U.S. patent application Ser. No. 13/233,599, filed Sep. 15, 2011, entitled "METHOD AND APPARATUS FOR IMPROVING THE FUEL ECONOMY OF A VARIABLE DISPLACEMENT ENGINE", each of which are incorporated herein by reference.

BACKGROUND

1. Field of the Described Embodiments

The described embodiments relate generally to automobile engine control. More particularly, methods and devices for directing selected engine operations through a diagnostic port during normal operation of an engine using are described.

2. Description of the Related Art

In automobile industry, there is a large aftermarket for devices that affect the factory performance of automobiles. One class of aftermarket devices is geared toward affecting the engine performance. For instance, an aftermarket engine control device can be designed to boost the power of the engine under certain conditions. As another example, an aftermarket device can be configured to cause the engine to burn fuel more efficiently under certain conditions to increase fuel efficiency.

Modern automobile engines include engine control units. The engine control unit determines the amount of fuel, ignition timing and other parameters that affect the performance of an internal combustion engine. Aftermarket devices exist that can be used to overwrite the factory software and/or data in an engine control unit to change the engine performance. For instance, the factory look-up tables and/or control algorithms in the engine control unit that are used to generate the control commands for the engine can be overwritten. The overwrite modification of the engine control unit is performed while the automobile is in a non-operational state, i.e., not being driven, and then, after it is completed, the automobile can be operated, i.e., driven around, using the modified engine control unit.

The factory settings for an engine control unit are selected with the objectives of operating the engine under the conditions that don't needlessly damage the engine and achieving a desired operational lifetime for the engine. The selected factory settings are verified via large amounts of testing. A disadvantage of modifying the factory look-up tables and/or control algorithms in an engine control unit is that it typically voids the warranty the manufacturer provides on the engine. The manufacturer voids the warranty because they don't know whether aftermarket modifications will damage and/or shorten the lifetime of the engine. The possibility of engine damage and reduced engine lifetime are also a concern to a user modifying an engine control unit via an aftermarket device. In view of the above, methods and apparatus are desired that allow the factory engine performance of an automobile to be modified, such as to improve fuel efficiency, that minimize the risks associated with modifying the engine control unit.

SUMMARY

A secondary control unit (SCU) for affecting the performance an automobile is described. The SCU can be configured to communicate with one or more vehicle controllers, such as the engine control unit, while the automobile is being driven. Based on data received from the vehicle controllers, the secondary controller can send a control command to the vehicle controller to effect the operation of the vehicle, such as the operation of the vehicle's engine.

In one embodiment, the SCU can be implemented as an aftermarket device that is installed in a vehicle after it is manufactured. The SCU is configured to receive power train related data from a vehicle controller, such an engine control unit, and based upon the received power train data determine when to send the control commands. In one implementation, the SCU sends the control commands and receive data via the vehicle's diagnostic port, such as an OBD-II port. Thus, the SCU can include an interface that is compatible with the vehicle's diagnostic port. In a particular embodiment, the SCU is Controller Area Network (CAN) compatible and configured to send commands and receive data on the vehicle's CAN bus. In various embodiments, the SCU includes a processor and memory that are used to execute control algorithms that determine when to issue one or more different control commands.

In some preferred embodiments, the SCU is used in a vehicle with a variable displacement engine and the SCU includes control algorithms that determine when to issue a control command that effects the displacement of the engine. In a particular embodiment, the control algorithms are configured to improve the fuel efficiency of the vehicle. In another particular embodiment, the control algorithms are configured to maintain the vehicle at a particular displacement—such as at a particular partial displacement or a full displacement more often than would be the case when operating under normal factory provided control algorithms. The control command generated by the SCU may be sent to the vehicle's engine control unit, which can accept or reject the control command based criteria programmed in the engine control unit when the vehicle was manufactured. In other embodiments, the control algorithms can be configured to prevent, or at least significantly reduce the activation of selected vehicle operational states that are perceived to adversely affect performance such as reduced displacement modes, engine shut-off while stopped modes, etc.

In another aspect, an electronic device is disclosed that includes: 1) a housing; 2) a processor and a memory disposed within the housing; 3) a connector suitable for coupling the device to a vehicle port; and 4) an interface that allows the processor to communicate with a vehicle controller such as an engine control unit or another power train controller. In some embodiments, the device may take the form of a dongle suitable for connection to a diagnostics port.

In some embodiments, the processor is configured to: a) receive from the engine control unit, power train state data characterizing a current operational state of the vehicle; and b) based upon the power train state data, determine whether to send a control command to the vehicle where the control command effects operation of the vehicle while it is being driven. In some implementations, when such a control command is sent, the processor is also arranged to receive a message from the vehicle indicating whether the control command has been implemented or rejected by the vehicle.

In a particular embodiment appropriate for use in a variable displacement engine the control command may be arranged to request the usage of a particular displacement mode of the variable displacement engine. The processor can be further configured to repeatedly issue the control command to maintain or change the displacement mode of the engine while the vehicle is being driven based upon a current operational state.

In some instances, the desired displacement commands may be used to improve the fuel efficiency of the vehicle. In other instances, the desired displacement commands may be used to help insure a particular performance characteristic.

BRIEF DESCRIPTION OF THE DRAWINGS

The embodiments will be readily understood by the following detailed description in conjunction with the accompanying drawings, wherein like reference numerals designate like structural elements, and in which:

FIG. 1 shows a block diagram of a native ECU in an automobile coupled to a secondary ECU in accordance with the described embodiments.

FIG. 2A shows an example of a secondary control unit (SCU) in accordance with the described embodiments.

FIG. 2B shows an example of an on-board diagnostic interface for an automobile in accordance with the described embodiments.

FIG. 3 shows an example of a secondary control unit (SCU) mounted to the interior of an automobile in accordance with the described embodiments.

DESCRIBED EMBODIMENTS

Figure 4:
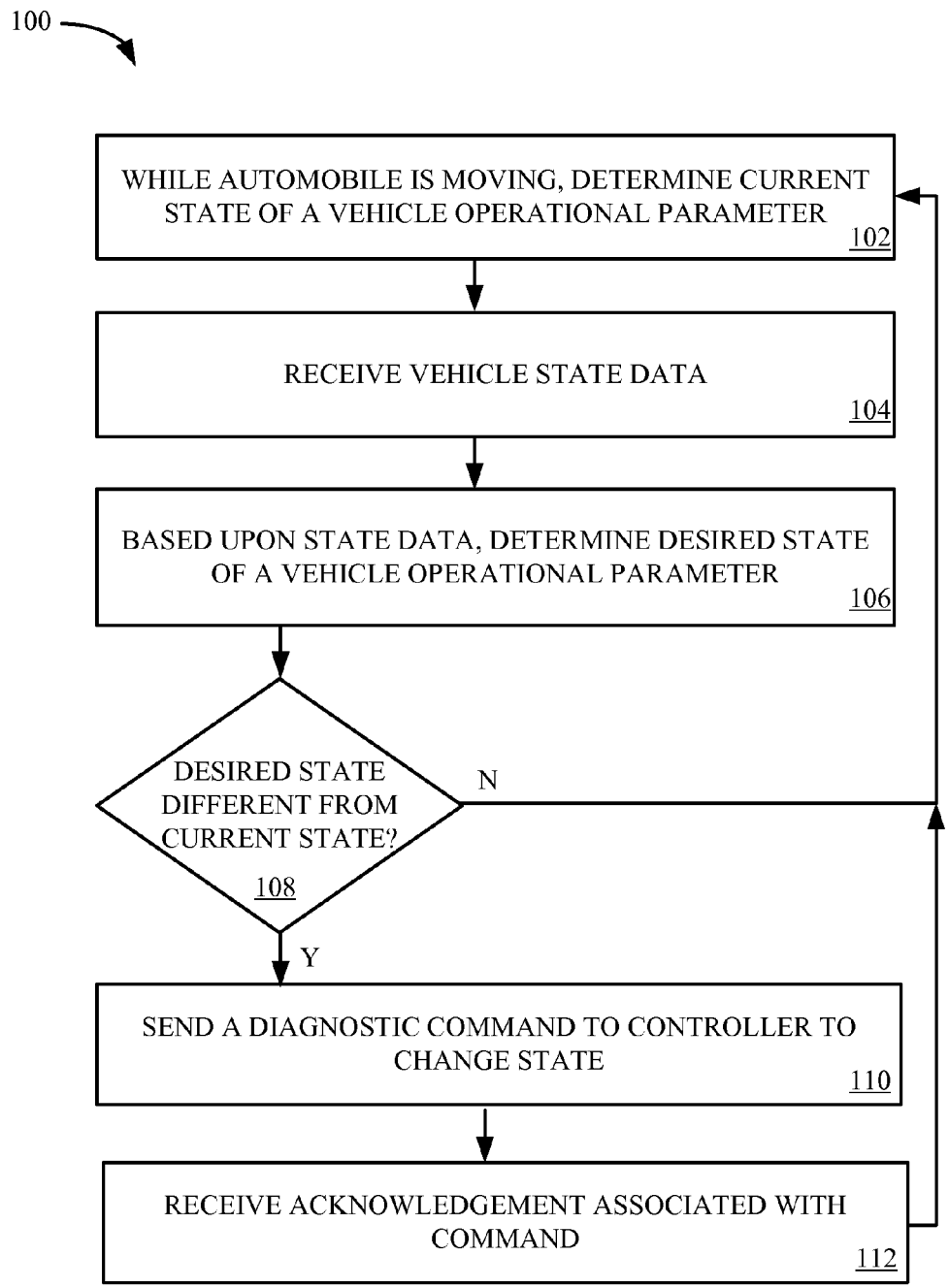
FIG. 4 is a flow chart of a method for controlling a vehicle subsystem in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Most modern automobile engines include an engine control unit (ECU) and/or other power train control units. The ECU includes software and data for generating control parameters related to the operation of the engine, such as control of the fuel mixture, control of the ignition timing and control of the idle speed. Typically, a diagnostic and reporting capability is provided that allows data from the ECU to be accessed. The diagnostic and reporting capability can be used to access and fix problems associated with the engine.

Since 1996, the On-board diagnostic (OBD)-II specification has been made mandatory for all cars sold in the United States. Further, a version of OBD-II, EOBD and JOBD, are used in vehicles sold in Europe and Japan, respectively. The OBD-II standard specifies the type of diagnostic connector and its pin-out, the electrical signaling protocols that are available, and the messaging format used for communications. It also provides a candidate list of vehicle parameters to monitor along with how to encode the data for each. In addition, the OBD-II standard provides an extensible list of Diagnostic Trouble Codes (DTC)s. As a result of this standardization, a single device can query the on-board computer(s) in most vehicles.

The OBD-II Diagnostic Trouble Codes are 4-digits, preceded by a letter; P for engine and transmission, B for Body, C for Chassis and U for Network. Individual manufacturers often enhance the OBD-II code set with additional proprietary DTCs. Further, via the OBD-II interface, some manufactures provide access to advanced diagnostic functions. The advanced diagnostic functions that are available vary from manufacturer to manufacturer. The advanced diagnostic functions can include the ability to enter commands for bi-direction tests that allow various subsystem components to be evaluated. After receiving a test request, the ECU can be configured to report 1) whether the test was carried out or not and 2) data associated with the test.

The bi-directional tests can be implemented to confirm the proper or improper functioning of a vehicle component. For instance, a vehicle can be configured with a command that allows solenoids on the vehicle to be activated. A vehicle may have hundreds of such tests available. The bi-directional tests are implemented by a mechanic while the vehicle is at rest. As described in more detail below, apparatus and method are described that allow the bi-directional testing capability of a vehicle to be used to control a vehicle subsystem during operation of the vehicle. In a particular embodiment, a dongle, including a processor and a memory, as well as a connector and an interface compatible with an OBD-II port, is configured to affect the operation of a vehicle's variable displacement engine while the vehicle is moving using a bi-directional test provided by the vehicle.

Figure 7:
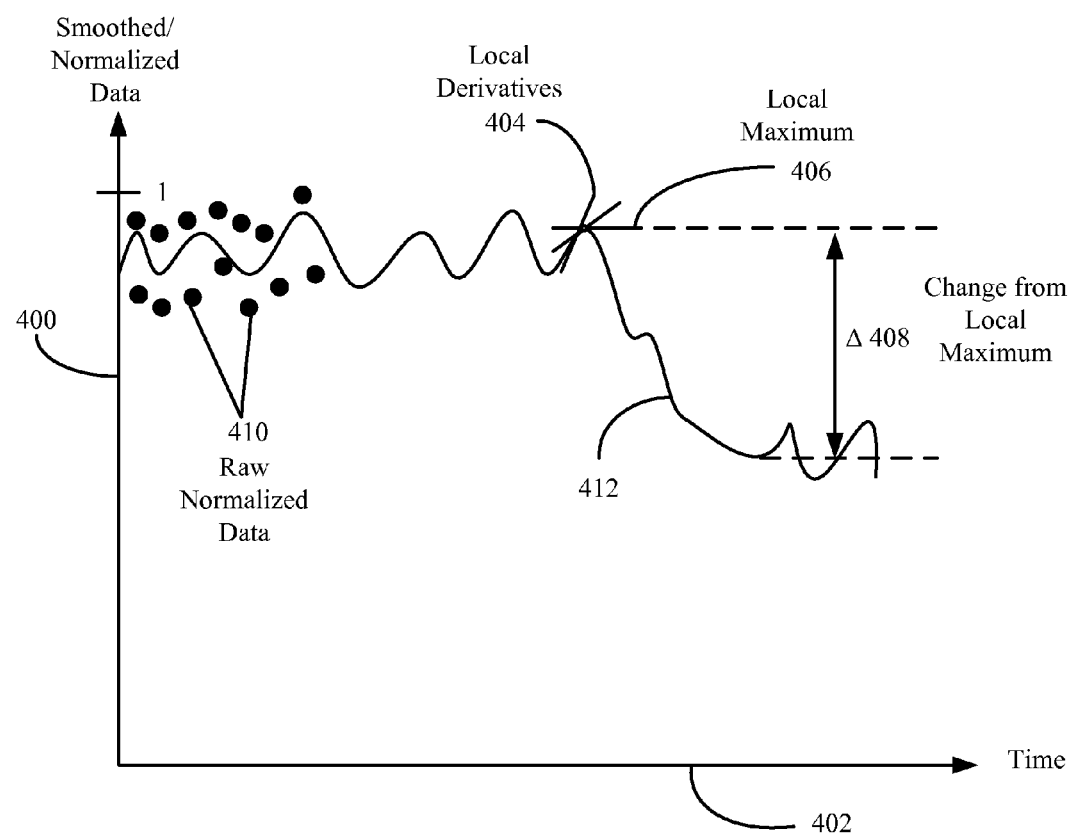
FIG. 7 is a plot of smoothed and normalized power train data with local extremum determination in accordance with the described embodiments.
Figure 8:
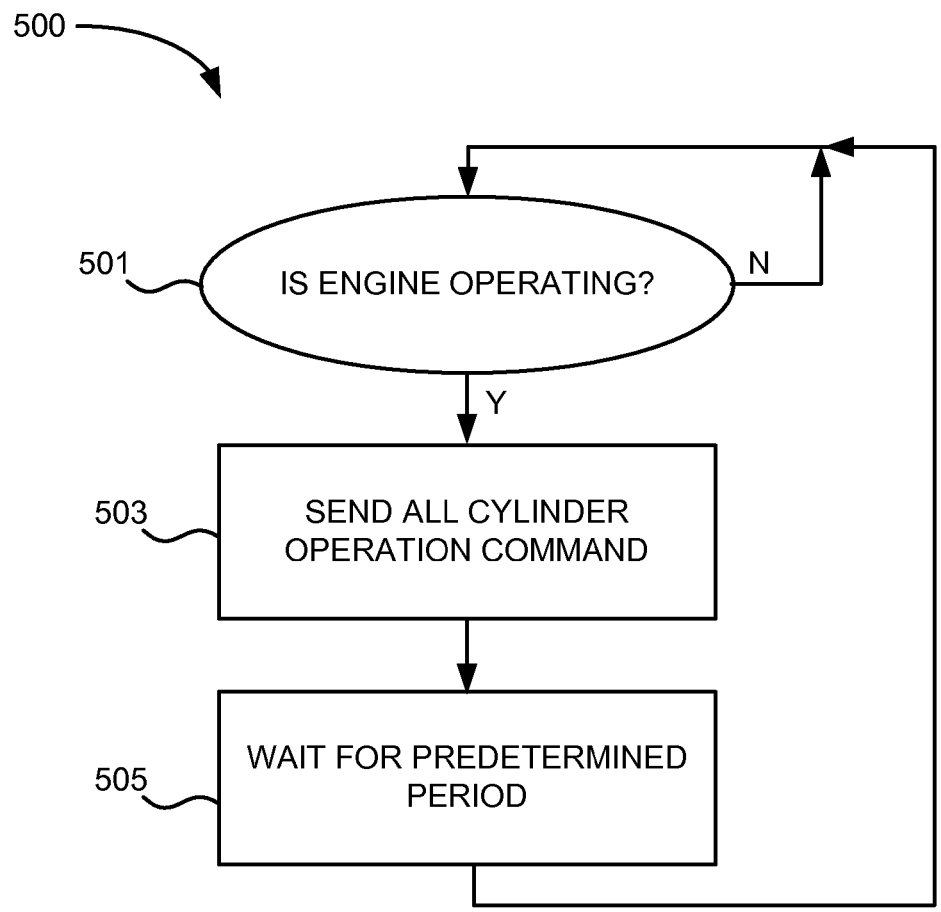
FIG. 8 is a flow chart of a method of maintaining a variable displacement engine in an all cylinder operation mode continually through the use of a secondary control unit.
Figure 9:
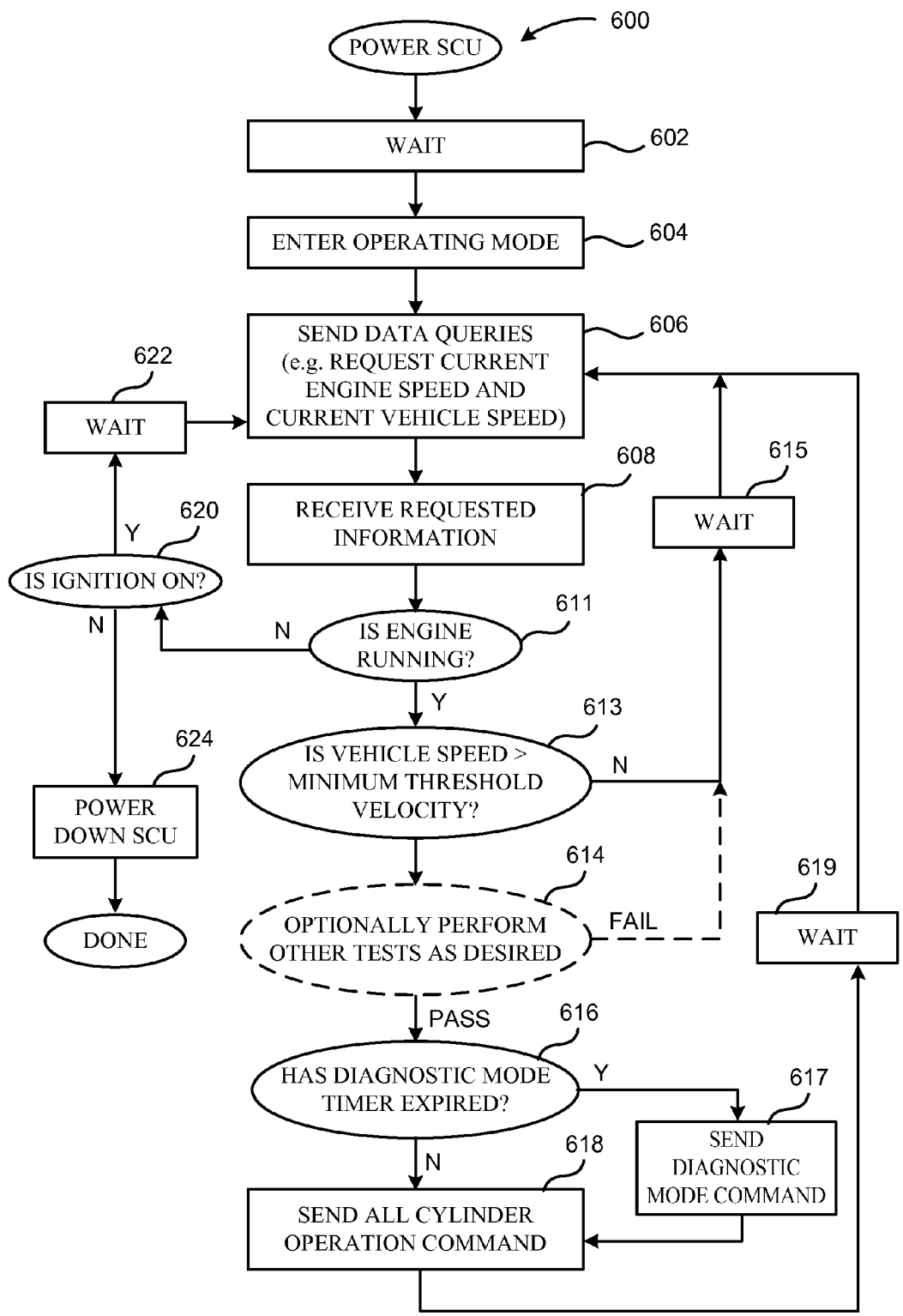
FIG. 9 is a flow chart of an alternative method of maintaining a variable displacement engine in an all cylinder operation mode continually through the use of a secondary control unit.

In more detail, with respect to FIG. 1, a block diagram of a secondary control unit coupled to an engine control unit is described. The secondary control unit can be configured to control operation of a vehicle sub-system component, such as the engine, using a bi-directional testing function. As is shown in FIG. 2A, in one embodiment, the secondary control unit can be provided as a dongle configured to interface with an OBD-II diagnostic interface. The OBD-II diagnostic interface is discussed with respect to FIG. 2B. With respect to FIG. 3, the mounting of an apparatus, such as the apparatus shown in FIG. 2A, within the interior of a vehicle is described. In FIG. 4, a method of controlling of a vehicle subsystem using a secondary control unit is described. In a particular embodiment, as described with respect to FIG. 5, the method is applied to controlling the operation of a variable displacement engine to improve fuel efficiency. With respect FIGS. 6 and 7, control algorithms that can be implemented in the secondary control unit are discussed. In one embodiment, the control algorithms can be used to determine a mode of operation for a variable displacement engine. FIGS. 8 and 9 illustrate a secondary control unit based methods of directing an engine to remain in a full displacement operating mode even when the factory settings would suggest partial displacement operation.

FIG. 1 shows a block diagram of a factory engine control unit (ECU) 10 in an automobile coupled to a Secondary Control Unit (SCU) 30. First, some details of the factory ECU 10 are described. The details include the configuration of the factory ECU 10 and how it communicates with other vehicle component. Next, details of an SCU 30 that can affect operations of the vehicle via communications with vehicle components, such as the factory ECU 10 are described.

The factory ECU 10 can include a processor 16, control algorithms executed by the process 20 and a memory 18. The memory 18 can store data, such as look-up tables, used by the processor 16 when executing the control algorithms 20. As described above, some aftermarket devices overwrite all or portion of the data in memory 18 and/or the control algorithms 20. In particular embodiments, as described herein, the data in memory 18 and the control algorithms 20 can be preserved so that the factory ECU 10 remains in the operational envelope proscribed by the manufacturer.

The term factory ECU 10 denotes that the engine control unit is operating with software or firmware approved by the manufacturer, such as the software/firmware installed in the ECU at the factory during manufacture of the vehicle as well as software/firmware upgrades approved by the manufacturer and subsequently installed on the ECU. For the purposes of this description, an ECU where the control algorithms and/or data used in the control algorithms has been modified in an unapproved manner, such as via a third-party aftermarket device, is not considered a factory ECU for the purposes of this description.

The factory ECU 10 can be configured to communicate with and receive data from a number of microprocessors distributed throughout the vehicle. For example, a modern vehicle can include 40-50 such microprocessors associated with various subsystems. Some of these microprocessors can be coupled to sensors. Thus, the factory ECU 10 can be configured to receive sensor data 12 from various sensors distributed throughout the vehicle, such as temperature and pressure sensors associated with the operation of the engine. The factory ECU 10 can be configured to send control commands 14 to various vehicle subsystems. For instance, the factory ECU 10 can send out a command that affects the idle speed of the vehicle or the amount of fuel consumed by the engine.

The factory ECU 10 can communicate with and receive data from various modules, which can include sensors and other microprocessor, via a vehicle communication bus. One type of vehicle communication bus is a CAN (controller area network) bus or the CAN-bus. The bus conductor for the CAN-bus can be generated from different wire configurations. For instance, the CAN-bus can be provided on a single wire, a twisted pair of wires or a fiber optic cable. Thus, SCU 30 can be configured to interface with different types of vehicle communication bus conductors.

Different communication protocols can be implemented on the vehicle communication bus. The communication protocols specify the format of messages transmitted on the vehicle communication bus. One example of a communication protocol that can be utilized is the CAN protocol. It allows automotive components to communicate on a single or dual-wire networked data bus at speeds up to 1 Mbps. The communication speed that is implemented on the CAN-bus can vary from manufacturer to manufacturer. Thus, the SCU 30 can be configured to operate at different communication speeds depending on the communication speed associated with the electronics of a particular vehicle. Other examples of communication protocols can also be utilized on a vehicle communication bus include CAN, SAE J1939, GMLAN, OBD II, SAE J1587 and LIN. The SCU 30 can be configured to communicate using one or more of these protocols and/or others. For instance, in one embodiment, the SCU 30 can be configured to communicate using a first communication protocol when connected to a first vehicle and communicate using a second communication protocol when connected to a second vehicle.

Devices connected to the CAN-bus are referred to as nodes. Each node that is attached to the CAN-bus may be capable of sending and receiving signals. The nodes each have their own unique address on the network. Thus, each node can receive the inputs and data it needs to function, while ignoring information intended for other nodes that share the network. When a node transmits information over the network, the information is coded so all the other modules recognize where it came from.

Each node on the CAN-bus can include a host processor, a CAN controller and a transceiver. The host processor decides what received messages mean and which messages it wants to transmit itself. Sensors, actuators and other control devices can be connected to the host processor. The CAN controller includes a synchronous clock used to determine when to send messages. It stores received bits serially until an entire message is available at which time the message can be fetched by the host processor. The host processor can send messages to the CAN controller, which can then transmit the bits associated with the message serially onto the bus. The transceiver, which can be integrated into the CAN controller, can perform signal conditioning such as converting signal levels from the bus to levels that the CAN controller can interpret and converting signal levels from the CAN controller into a format compatible with the CAN-bus. As is described more detail as follows, the SCU 30 may be configured to communicate on the CAN-bus and thus, may include the components that allow it to act as a node on the CAN-bus.

Returning to FIG. 1, in one embodiment, a secondary electronic unit (SCU) 30 is configured to communicate with the factory ECU 10 via the diagnostic port 22. A standard configuration for a diagnostic port 22 that is compatible with OBD-II is described below with respect to FIG. 2B although it should be appreciated that other configurations may be utilized in other embodiments. In some vehicles, the vehicle communication bus, such as the CAN-bus, can be accessed via the diagnostic port 22, such that a device connected to the diagnostic port 22 may send messages that are routed on the vehicle communication bus. In other vehicles, direct access to the vehicle bus may not be enabled via the diagnostic port 22. One reason to limit direct access to the vehicle communication bus from a device connected via the diagnostic port is that improper communications on the vehicle communication bus can interfere with critical commands needed for operating the vehicle.

In alternate embodiments, the SCU 30 can be coupled directly to the vehicle communication bus, such as a CAN-bus. If the SCU 30 is CAN compliant, it may be arranged to include a CAN controller and transceiver that allows it to function as a node on the CAN-bus. Further, it can include an interface that allows it to be directly connected to the vehicle communication bus.

When the SCU 30 is configured to communicate on the CAN-bus via the diagnostic port 22 or some other interface to the CAN-bus (e.g., a direct connection), the SCU 30 may include a memory storing information that allows it to address different nodes on the CAN bus. Each node may have a different address and the CAN addresses can vary from manufacturer. Thus, if the SCU 30 is configured to operate with different vehicle types, the memory may include CAN addresses for multiple vehicles types. When installed in a particular vehicle, the SCU 30 may be configured to utilize the CAN addresses that are compatible with the vehicle type in which it is installed.

Via the diagnostic port 22 and/or another interface that provides access to the vehicle bus, the SCU 30 can monitor the status of the vehicle while it is moving, such as when a user is driving the vehicle. For instance, the SCU 30 can obtain current vehicle operating parameters, such as the engine RPM, temperatures and pressures associated with various sensors, an accelerator pedal position, a load on the engine, etc. Obtaining this information may involve bi-directional communications with various vehicle controllers. For instance, the SCU 30 can be configured to communicate with the factory ECU 10 or a transmission control unit (TCU) in a bi-directional manner. In addition, the SCU 30 can be configured to send commands associated with various self-tests and diagnostics available on the vehicle. Each vehicle controller on the vehicle communication bus can be enabled with different self-tests and diagnostics that are implemented when the controller receives the proper command. In response to the commands associated with the self-tests and diagnostics, the SCU 30 can receive information, such as but not limited to, an acknowledgement that the command was carried out, b) an acknowledgement that the command wasn't carried out and possibly a reason why the command wasn't carried out and/or c) the data associated with the implementation of the command.

The self-tests and diagnostics and their associated commands can vary from vehicle to vehicle. In one embodiment, the SCU 30 can be compatible with multiple vehicle types. Thus, the SCU 30 may store commands and control algorithms tailored to the self-tests and diagnostics available on each vehicle. When installed in a particular vehicle, the SCU 30 may determine the type of vehicle in which it is installed and self-configure to be compatible with the vehicle. In another embodiment, the SCU 30 can include an interface that allows the vehicle type to be set on the device, such as via a user input.

A vehicle can include many different types of control units that control various aspects of the vehicle. Each of the control units can be configured to accept different control commands including the self-test and diagnostic commands. In various embodiments, the SCU 30 can be configured to utilize any type of control command recognized by a control unit on a vehicle, such as the ECU.

In some instances, the control commands which are available through a vehicle interface, such as the diagnostic port, can be limited in some manner. For instance, the ECU can be configured to block or ignore certain control commands that are available on the vehicle when they are received via the diagnostic port. In some embodiments, the SCU 30 can be configured with logic or a physical interface that bypasses a command block implemented on a vehicle so that a control command generated by the SCU 30 that would normally be blocked is accepted. In other embodiments, the software in the ECU can be modified in some manner to remove the block that prevents a control command issued from the SCU 30 from being utilized.

The SCU 30 can include an interface 32 that allows for communications with various vehicle components, such as a vehicle's ECU or TCU (Transmission Control Unit). In one embodiment, the interface 32 includes a connector with a wire lead where the connector is compatible with a matching vehicle connector/interface, such as the diagnostic port 22. In a particular embodiment, the connector can be compatible with an OBD-II interface port. In another embodiment, the connector can be compatible with an available port that allows for communications on the vehicle communication bus, such as a CAN-bus.

In yet another embodiment, a wireless communication link can be used between the connector to vehicle interface and the body of the SCU 30. Thus, a wire lead may not be required. The vehicle interface may allow power to be transferred from the vehicle to the SCU 30. When a wireless communication interface is used, the SCU 30 may include its own power supply in lieu of receiving power from the vehicle.

In the SCU 30, the interface 32 can be coupled to a communication interface 35. The communication interface 35 can format communications to be compatible with a particular communication protocol. For instance, the communication interface 35 can format voltage level of the communications to be compatible with the diagnostic port 22 or a CAN-bus (not shown). In one embodiment, as described above, the communication interface can include a CAN controller and a CAN compatible transceiver so that the SCU 30 can act as a node on a CAN-bus.

The processor 34 communicates with vehicle components, such as but not limited to the factory ECU 10, via the communication interface 35 and interface 32. The processor 34 can be configured to format the communications to be consistent with one or more different communication protocols, such as but not limited to CAN. The memory 38 can store information used to enable the communications, such as protocol specific data. Further, it can store information that allows specific vehicle components to be addressed, such as CAN addresses on the CAN bus.

As described above, the processor 34 can be configured to issue one or more different control commands that are associated with self-tests and diagnostics available on the vehicle. The control commands can be used to affect one or more different vehicle subsystems, such as the engine or the transmission. As an example, the processor 34 can be configured to issue control commands that affect the engine displacement, the spark timing and/or the torque controller.

The processor 34 can be configured to execute control algorithms 40 that determine when to issue the control commands. The control algorithms can be affected by the vehicle operational state data. The processor 34 can be configured to monitor the vehicle's operational state and receive data associated with the current operational state, such as the latest data from various sensors disposed within the vehicle. As an example, as will be described in more detail below, accelerator pedal position data can affect a control algorithm the determines when to issue a control command requesting a vehicle to change its engine displacement. Further details of the control algorithms are described below with respect to FIGS. 4-7.

In various embodiments, the control algorithms 40 can be configured to determine whether to issue one or more control commands that control 1) a single vehicle component, such as the engine, 2) multiple vehicle components, such as the engine and transmission, 3) a single aspect of each of the controlled vehicle components, such as the displacement of the engine, and 4) multiple aspects of each the controlled vehicle components, such as the engine displacement, spark timing and fuel mixture. For instance, a control algorithm can be configured that affects the engine and the transmission. After issuing a control command that affects the engine performance (e.g., a change in the displacement of the engine, the control algorithm may issue a control command that affects the transmission to improve the drivability of the vehicle. The control algorithms and/or data utilized by the control algorithms can be stored in an encrypted format.

The SCU 30 can include one or more status indicators 36, such as but not limited to a light source. In one embodiment, the status indicator 36 can be activated when the SCU 30 is activated and operating properly. In another embodiment, the processor 34 can be configured to control the status indicator 36 to convey an operational characteristic of the SCU 30. For instance, each time a particular control command is issued by the SCU 30, the processor 34 can be configured to cause the status indicator 36 to change, such as to blink on and off when a light is used for the status indicator. Other types of status indicators besides a light source can be utilized. For instance, an audio mechanism or a vibration mechanism can be used to indicate a status of the SCU 30. In another example, a small display can be coupled to the SCU 30. The processor 34 can be configured to output status information associated with the SCU 30 to the display.

The SCU 30 can include a power source, such as battery. The power source can be used to provide power to the SCU components, such as the processor 34. In another embodiment, the SCU 30 can be configured to draw power from a vehicle to which it is coupled. For instance, there is a pin in an OBD-II connector (see FIG. 2B) that provides power from the vehicle battery. Thus, the SCU 30 may not include its own internal power source.

There are other methods for changing the performance of an engine from the performance dictated by the factory ECU. In older cars, a large set of operational tables is included in the factory ECU that allows the ECU to determine how to operate the various engine components under different conditions. In newer cars, the ECU includes logic that simulates the operation of the engine and determines how to operate the various engine components to achieve a particular operational state, such as an output of some torque amount. The engine simulation utilizes calibration tables. The operational tables or calibration tables are typically stored in a memory on the ECU.

One method of changing the engine performance is to alter the operational tables stored in memory. For instance, the operational tables or calibration tables stored in the memory can be replaced with new tables. As the tables are needed for the vehicle to operate, the replacement is done while the vehicle non-operational.

Another method is to replace the entire ECU. The new ECU can include control algorithms using operational tables or calibration tables that are totally different than what is provided on the factory ECU. The new ECU operates the engine according to its logic and data. Since the ECU is required to operate the engine, this modification is necessarily performed while the vehicle is non-operational.

Another method of changing the engine performance is to intercept and alter data before it reaches the ECU. The ECU can base its operations on data received from various sensors. With older vehicles, such as vehicles employing operational tables, devices can be used that intercept the sensor data and replace it with new sensor data while the vehicle is operating. The engine performance is modified from how it would normally operate because the ECU is receiving false data. In newer cars employing an engine simulation, this approach often doesn't work because the ECU can determine, based upon the engine simulation, that the sensor data is not consistent with how the engine is currently operating. Thus, the modified data can cause the ECU to trigger an error condition.

Each of the three methods described above, replacing operational or calibration tables, replacing the factory ECU or falsifying data can void a vehicle's warranty and possibly lead to engine damage. In embodiments described herein, the operational or calibrations tables don't have to be replaced, the factory ECU doesn't have to be replaced and vehicle data doesn't have to be falsified. Thus, the operational bounds of engine under various conditions proscribed by the factory ECU can be preserved. However, within the operational bounds dictated by the factory ECU, the performance of the engine can still be modified.

Next, some possible SCU device configurations are described. These configurations are described for the purposes of illustration and are not meant to be limiting. For example, FIG. 2A shows one configuration of a SCU 30. The SCU 30 includes a housing 68. The processor 34, memory 38, communication interface 35 and control algorithms 40 can be located within the housing. The housing 68 can be formed from a suitable material, such as a metal or plastic. The shape of the housing may be approximately rectangular. However, the shape of the housing is provided for illustrative purposes and different shaped housing can be utilized.

A mounting interface 70 is coupled to the housing 68. In one embodiment, the mounting interface can be a Velcro™ strip coupled to the housing via an adhesive, such as a double-sided tape. A compatible Velcro™ strip can be mounted to a vehicle surface using an adhesive allowing the SCU 30 to be mounted to a vehicle surface. In another embodiment, a bracket can be provided. The bracket can be attached to a vehicle surface. The housing 68 can be shaped so that when coupled to the bracket a suitable connection is formed between the housing and the bracket.

A translucent cover 72 covering a light source is shown mounted to the housing 68. The light source can be used as a status indicator. The translucent cover 72 and associated light source is shown at one end of the housing but in alternate embodiments, the translucent cover and light source can be located at different locations on the housing. The translucent cover 72 and mounting interface 70 can be arranged such that the status indicator associated with the translucent cover 72 is visible to a user when the SCU device 30 is mounted in a vehicle.

A wire cable 66 extends from the housing 68. A connector 62 is coupled to the wire cable 66. A number of pins 64 extend from the connector. The connector 62 is configured for compatibility with a vehicle interface. In one embodiment, the connector 62 can be shaped to for compatibility with an OBD-II interface. An example of OBD-II interface 50 is shown in FIG. 2B. It includes 16 pins and a particular shape 52. The connector shape 62 and pins 64 may fit the shape 52 and align with the pin-acceptors on the OBD-II plug. As described above, other type connectors can be utilized and this example is provided for the purposes of illustration only.

FIG. 3 shows an example of a SCU 30 mounted to the interior of an automobile in accordance with the described embodiments. In one embodiment, the SCU 30 can be mounted to a surface on the vehicle's interior 80. Typically, the OBD-II diagnostic port is located within 2 feet of the steering column. Thus, in some embodiments, the SCU 30 can be mounted on a surface near the steering column after it is coupled to the OBD-II diagnostic port. If the OBD-II diagnostic port is located at some other location in the vehicle interior 80, then the SCU 30 can be located near this location.

If another type of interface is used to couple the SCU 30 to the vehicle, such as an interface compatible with a vehicle's CAN-bus. The SCU 30 can be mounted in a different location. In other embodiments, the SCU 30 can be mounted underneath the hood of the vehicle in the engine compartment or can be mounted in a trunk of the vehicle.

The SCU 30 is shown mounted to a panel 90 that extends beneath the steering wheel. The SCU 30 is mounted to a bottom surface of the panel 90 such that the SCU is in a proximately horizontal position and the translucent cover 72 of the status indicator is visible to the user. In other embodiments, the SCU 30 can be mounted to a surface, such as a surface of panel 90, which is more vertically orientated. For example, it can be mounted to portion of the panel above the location shown in FIG. 3. Thus, the mounting location shown in FIG. 3 is provided for the purpose of illustration and is not meant to be limiting.

FIG. 4 is a flow chart of a method 100 for controlling a vehicle subsystem via an SCU. In 102, while the vehicle is moving, the SCU can determine a current state of the vehicle. The current of state of the vehicle can be characterized by different vehicle operational parameters. The vehicle operational parameters can be associated with a vehicle subsystem such as the engine or the transmission. For example, the vehicle operational parameter can be displacement mode in which the engine is currently operating, such as 4 cylinder or 8 cylinders. In another example, the vehicle operational parameter can be related to a current state of the transmission, such as sport driving mode or a normal driving mode or a gear in which the transmission is operating. In yet another example, the current state of the vehicle can be characterized from sensor data associated with various vehicle components, such as but not limited to an 1) RPM of the engine, 2) a temperature of the engine at a particular location, 3) a pressure of the engine at a particular location, or 4) a position of the accelerator pedal.

In 104, SCU can receive information from the vehicle that characterizes the current state of the vehicle, such as engine speed, a temperature of various components, the gear in which the transmission is operating, an accelerator pedal position, etc. The SCU can be continuously monitoring these parameters. Thus, the SCU can store a time history of the various parameters in its memory. In 106, based upon the received vehicle information, the SCU can determine whether the vehicle can be placed in a desired state. As an example, the desired state can be related to a particular engine operational mode or a transmission operational mode. One example of a particular engine operational mode is a displacement mode for the engine. Details of determining whether a vehicle can be placed in a desired engine displacement mode are described with respect to FIGS. 6 and 7.

In 108, the SCU can determine whether the desired state is different from the current state of the vehicle. When the SCU determines the vehicle is operating as desired, then the method can return to 102. When the SCU determines the vehicle is not operating as desired, then 110, i.e., the desired state is different from the current state, the SCU can send one or more control commands to a controller in the vehicle, such as the ECU. The one or more control commands can be configured to direct the vehicle to the desired operational state. In a particular embodiment, the one or more control commands can be associated with self-tests and diagnostics that are available on the vehicle. Thus, a diagnostic associated command can be sent from the SCU to the vehicle. As described above, the diagnostic command may be sent via the diagnostic port on the vehicle, such as an OBD-II port. In other circumstances, the control commands can be operational commands that are unrelated to diagnostic or self-test activities.

In 112, the SCU can receive an acknowledgement from the vehicle, such as from the ECU, indicating whether the one or more control commands have been implemented. If the one or more control commands have not been implemented, then the acknowledgement can include information indicating why the one or more control commands were not implemented. For example, in the ECU on the vehicle can reject a received control command related to the engine if it places the engine in an unallowable operational state. Thus, the vehicle can be configured to evaluate its current operational state and determine whether the control command is allowable based upon its current operational state before implementing a control command from the SCU. Thus, the ECU can include data and control algorithms that allow the operational state of the vehicle to be assessed in regards to implementing a particular control command.

In one embodiment, both the SCU and ECU can be configured to each issue the same one or more control commands that direct the vehicle towards a desired operational state. For instance, both the SCU and ECU can be configured to issue a control command that causes the engine to operate in a particular mode, such as a particular variable displacement mode. Both the SCU and ECU can include control algorithms that determine whether or not to issue a control command shared in common. The control algorithms including the data used to determine whether to issue the shared control command can be different in the SCU and the vehicle controller, such as the ECU. In addition, to prevent damage to the vehicle, the vehicle controller can be configured to decide whether or not to implement the control command received from the SCU. Thus, the control command from the SCU to the vehicle controller can be referred to as an advisory command since the vehicle controller is not required to implement the control command received from the SCU.

Figure 5:
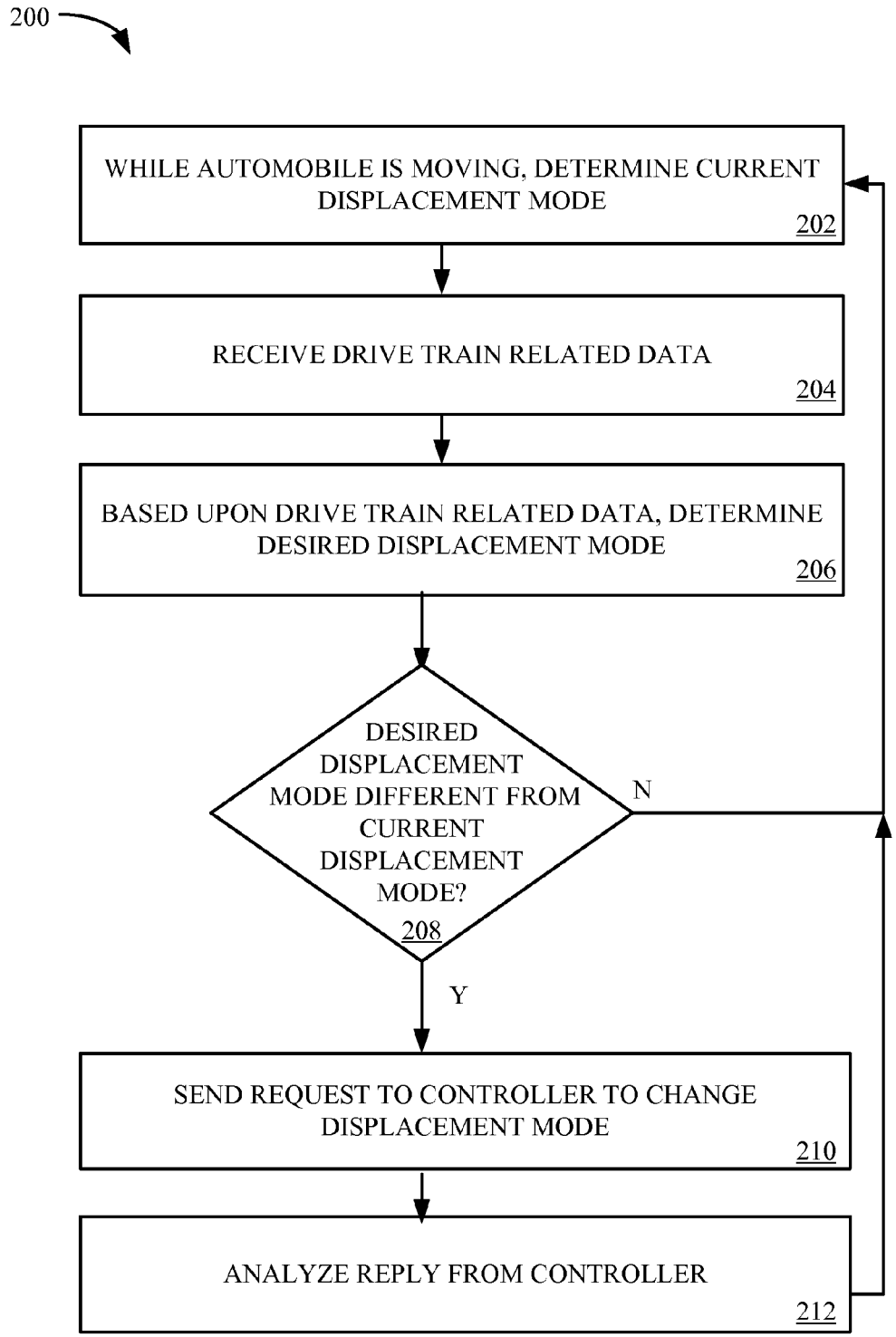
FIG. 5 is a flow chart of a method for controlling a variable displacement engine using a secondary CU in accordance with the described embodiments.

FIG. 5 is a flow chart of a method 200 for controlling a variable displacement engine using a SCU. The variable displacement engine can include two or more displacement modes. For instance, an 8 cylinder engine can be configured to operate using 8, 6 and 4 cylinders. In another example, an 8 cylinder engine can be configured to operate using 8 or 4 cylinders. The method can be configured to when to operate the vehicle in each of its two or more displacement modes. In one embodiment, the method can be designed to favor engine modes that increase the fuel efficiency of the vehicle. An example of vehicles that include an eight cylinder engine that is configured to operate in a 8 cylinder mode or a 4 cylinder mode are 2007 and later model years of the Chevy Tahoe™, Yukon™ and Escalade™ by General Motors (Detroit, Mich.).

In 202, the SCU determines the vehicle's current displacement. The SCU can be configured to communicate with a vehicle subsystem that maintains this data, such as the ECU. In one embodiment, a vehicle can include an active fuel management system that determines which cylinders on the engine are enabled at a particular time while the vehicle is moving. The SCU can receive data from the active fuel management system indicating the current number of cylinders enabled on the engine.

In 204, the SCU monitors and receives data associated with a number of drive train state variables. As described above, in one embodiment, this information can be obtained via communications through the vehicle's diagnostic port. The vehicle's diagnostic port can be an OBD-II compatible port. Examples of data that the SCU can receive include one or more of the vehicle speed, manifold pressure, engine RPM, accelerator pedal position, engine coolant temperature, transmission gear, the calculated engine load or combinations. The SCU can be configured to store one or more these variables as a function of time for some period of time. After some time, a portion of the stored time based data can be deleted or overwritten.

In 206, based upon the drive train related data, the SCU is configured to determine the desired displacement mode to achieve a particular engine performance. An example of method that is geared to maximizing fuel efficiency of the engine is described below with the respect to FIGS. 6 and 7. However, the displacement mode can be selected for other engine performance parameters and the example of fuel efficiency is provided for the purposes of illustration only.

In 208, it can be determined whether the desired displacement mode is different from the current displacement mode. If the desired displacement mode and the current displacement mode are the same, then the method can return to 202 and the method can be updated with the latest drive train state data. If the desired displacement mode and the current displacement mode are different, then in 210, the SCU can send a request to a vehicle controller, such as the ECU or the vehicle's fuel management system, to change the vehicle's displacement mode.

In one embodiment, the request can be in the form of a self-test or diagnostic command that is available on the vehicle. For example, in the shop, while the vehicle is stationary, a mechanic might use a self-test or a diagnostic command for a particular displacement mode to determine whether the engine can operate in each of the displacement modes. When the appropriate vehicle controller, such as the ECU, receives the test command, in some embodiments, the vehicle controller can be configured to accept or reject the self-test or diagnostic command according to some criteria utilized by the vehicle controller. In other embodiments, operational control commands may be used.

If the vehicle controller accepts the control command, an acknowledgement can be sent from controller to the SCU indicating the control command has been accepted. If the vehicle controller rejects the control command, the vehicle controller can send a message indicating the control command has been rejected to the SCU. In some embodiment, the message indicating the control command has been rejected can include information, such as error codes, that specify why the control command is rejected.

The SCU can also be configured store and track information related to the error conditions. An error condition can be generated because the vehicle is in the wrong gear or the engine RPM is not within some required range, as determined by the vehicle controller, when the SCU sent the control command to change the displacement mode to the vehicle controller. The SCU can be configured to keep a counter that is updated each time an error condition occurs or a control command is rejected. For example, one or more counters can be updated each time a wrong gear or an engine RPM out of range error condition is detected. Further, it can be configured to store other data associated with the error condition, such as the gear the vehicle was in when the error condition occurred and other data associated with the state of the drive train. In one embodiment, the SCU can be configured to allow the error condition data to be downloaded from the SCU to another device for additional analysis. The error data can be used to refine the control algorithms to reduce the occurrence of the error conditions.

In 212, the SCU can receive and analyze the reply from the ECU. Then, the method can return to 202. In one embodiment, when the control command is rejected, the SCU can be configured add some delay period before it again attempts to issue a control command to change the displacement mode. For instance, after the vehicle controller rejects the displacement mode requested by SCU, in 206, the desired displacement mode can be set to the current displacement mode for some time period without performing the determination, such as the determination described with respect to FIGS. 6 and 7. After the time period elapses, the determination can again be performed.

Next, a method for determining a displacement mode for a vehicle is described. For illustrative purposes, a method is described for determining when to place a vehicle in one of two different modes, such between 4 and 8 cylinders in an engine with eight cylinders. As described above, multiple engine modes and engine types with different cylinder configurations are possible. The method involves data smoothing and calculating time based derivatives of the smoothed data where the data is received from a vehicle controller, such as the ECU. The smoothed data and derivative calculations are used to determine whether to issue a control command to place the vehicle in a particular displacement mode. These techniques are applicable to other control algorithms used to affect engine performance and are not limited to only control algorithms associated with determining a displacement mode of engine for the purposes of improving fuel efficiency.

Figure 6:
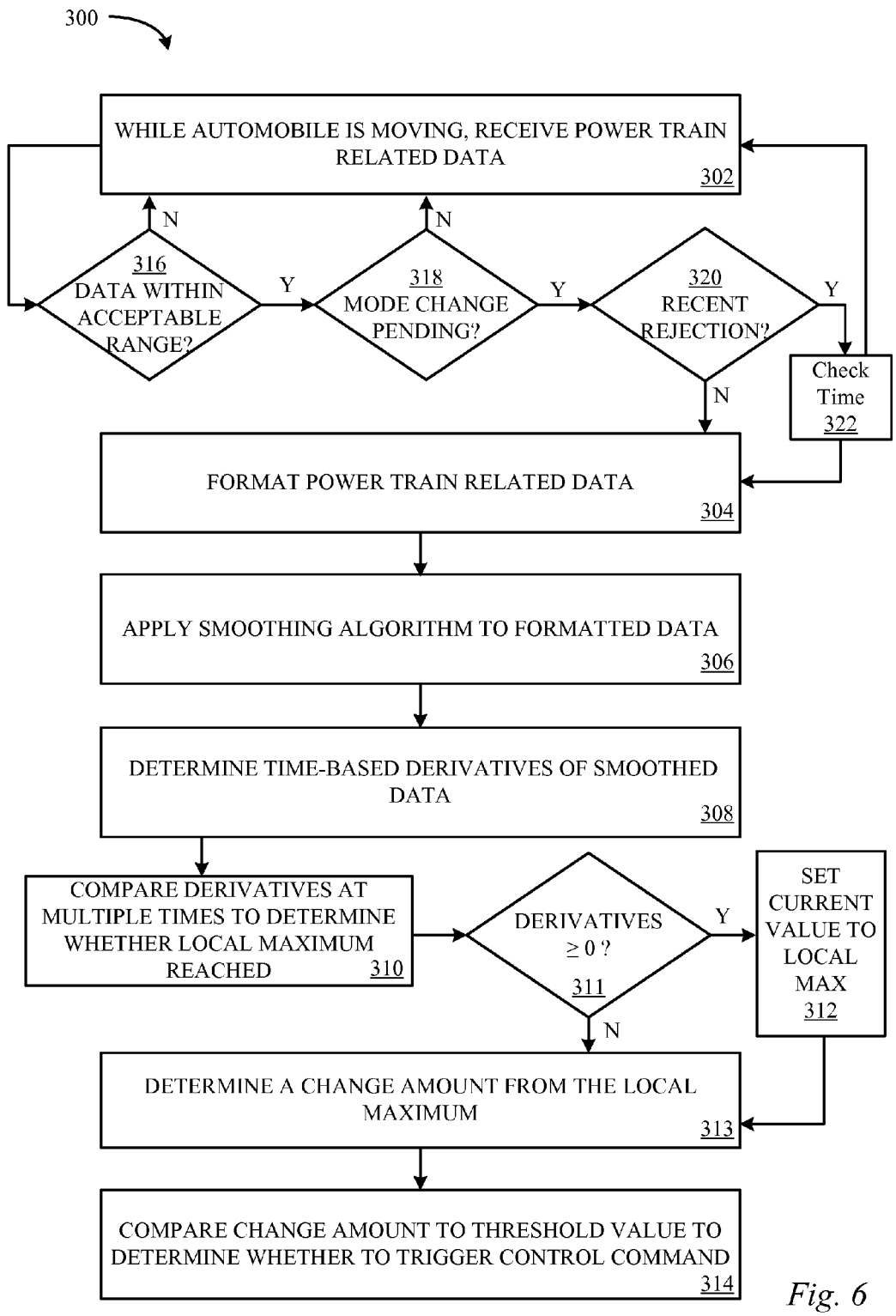
FIG. 6 is a flow chart of a method for controlling an engine including a data smoothing algorithm in accordance with the described embodiments.

FIG. 6 is a flow chart of a method 300 for controlling an engine including a data smoothing algorithm. In 302, while the vehicle is moving, the SCU can receive power train data from the vehicle's electronic control system. Some examples of power train variables that the SCU can receive include but are not limited to vehicle speed, manifold pressure, engine RPM, accelerator pedal position, engine coolant temperature, transmission gear and calculated load. The SCU can store an acceptable range for one or of these power train variables.

In 316, the SCU can compare the current value of one or more power train variables to their acceptable range. If one or more of the power train variables is out of range, the method can be configured to return to 302 to receive the values for the power train variables for the next state. If the one or more power train variables that are checked are in range, in 318, it can be determined whether a change mode command is currently pending, i.e., the SCU has sent a request to the ECU to change the displacement mode of the engine but has not received a reply yet. If a mode change is pending, the method can return to 302. If a mode change is not pending, then in 320, it can be determined whether a change mode command has been recently rejected by a vehicle controller, such as the ECU. If there hasn't been a recent rejection, then the method can proceed to 304.

In 320, if it is determined there has been a recent rejection, then in 322, the time elapsed since the last rejection can be checked. If the elapsed time exceeds a threshold value then the method can advance to step 304. If the elapsed time doesn't exceed the threshold value, then the method can return to step 302.

In one embodiment, there are four conditions under which a control command is issued to change the displacement mode, such as from 8 cylinders to 4 cylinders. A first condition is a drop of some magnitude in the accelerator pedal position. A second condition is a drop of some magnitude in the calculated load. The third condition is if the vehicle is an observed cruising state. A fourth condition is that the calculated load is below a certain value. In various embodiments, one or more of these conditions can be used in the algorithm.

To determine the drop in the accelerator position and whether the vehicle was in a cruising state, it was found beneficial to normalize and smooth the data, such as the calculated load and the accelerator pedal position received from the vehicle controller prior to using the data. The data received from the ECU can include a lot of noise which can be somewhat eliminated by smoothing. In 302 and 304, the data received from vehicle controller can be normalized to some reference value and then smoothed as a function of time. A comparison of the raw normalized data and the smoothed data is shown in FIG. 7.

One example of a smoothing algorithm that can be applied is the exponential smoothing algorithm, $$S_1 = X_0$$

$$S_t = \alpha X_{t-1} + (1-\alpha) S_{t-1}, t > 1 \text{ and } 0 < \alpha < 1$$

Other smoothing algorithms are possible and above equations are provided for the purposes of illustration only. The smoothing is applied to reduce noise in the values received from the vehicle.

A driver can cause changes in the vehicle data by changing the accelerator pedal position or braking. Under similar driving conditions, different drivers can apply the accelerator pedal and brakes differently. In one embodiment, the SCU can be configured to analyze the driving behavior of a particular driver and adjust the algorithm to account for a particular driver's behavior. For example, a cruise state can be determined by examining the position of the accelerator pedal over time. If the position accelerator pedal is not changing much over time, it can be assumed that the vehicle is in a cruise state. Different drivers can generate greater or smaller ranges of pedal position to maintain the cruise state. For a driver that tends to generate a greater range of pedal positions, the threshold value for determining whether the vehicle is in a cruise state can be increased to account for the driver's behavior.

In one embodiment, the SCU includes an interface that allows a user to select different settings. The different settings can include different threshold ranges for determining when to attempt to issue a control command, such as a command to switch to a particular displacement mode. For instance, the SCU could include two switch positions aggressive and normal. In the aggressive mode, the SCU would more frequently attempt to switch to a particular displacement mode than in the normal node. The more frequent attempts in the aggressive mode can result for adjusting the thresholds at which a control command is issued or by including more conditions for when to trigger the control command. For instance, in the normal mode, 3 of the 4 conditions for triggering a change in the displacement mode might be utilized while in the aggressive modes all the conditions might be utilized.

This feature may be useful if the user knows what type of driving conditions will be occurring on a trip. For instance, if the user is taking a long trip that includes a large percentage of cruising, then the user may wish to change the tolerances for detecting a cruise condition in such a way that the amount of time the engine runs in a displacement mode less than using all of the cylinder is maximized. If the user is going to be driving in traffic or locally with a lot of speed changes, then the user may not wish to use this setting.

Next, in 308, time-based derivatives of the smoothed data are determined. In one embodiment, only first derivatives are calculated. In other embodiments, higher order derivates, such as the second derivative can be calculated and utilized. In 310, the time based derivatives at multiple times are examined. The first derivative with respect to time of the normalized and smoothed data can be used to determine if a local maximum. In one embodiment, a recent local maximum is determined to occur when the last three values of the first derivative are greater than or equal to zero. Each time this condition is met, the SCU can be configured to update the past value of the local maximum with the current value.

For the purposes of determining whether cruising is occurring, a present value of the accelerator pedal position is compared to the most recent local maximum. If the present value of the accelerator pedal position is within some defined percentage of the most recent local maximum, then the vehicle can be determined to be cruising. In response to this determination, the SCU can request that the vehicle operate at a particular displacement mode, such as less than the maximum amount of cylinders to improve fuel efficiency. Thus, when it is determined the vehicle is in a cruise mode, the SCU can send a control command to the ECU to operate with a particular amount of cylinders.

In 311, the signs of one or more of the first derivatives can be checked. In one embodiment, when the first derivatives at three or more times is greater than zero, then in 312, the local maximum can be set to the current value of the smoothed and/or formatted data. Thus, in 313, the change amount from the local maximum will be zero. In 311, when the three or derivatives are each not greater than or equal to zero, then the local maximum is not changed and a change amount from the local maximum can be determined in 313.

In 313 and 314, the SCU can be configured to determine if there has been a drop in the engine load or the accelerator pedal position of a sufficient amount to trigger a control command to change the displacement of the engine, such as to less than the maximum available cylinders. The SCU can store threshold values that result in a control command being triggered. When the threshold is exceeded. The SCU can send a control command to a vehicle controller to change the displacement of the engine.

With respect to FIGS. 5 and 6, a method was described that can be implemented on a SCU. This method is not limited to implementation on the SCU. In one embodiment, the method can be implemented directly on the vehicle's ECU. In this instance, it wouldn't be necessary to employ the SCU to implement the method.

Next, with respect to FIG. 7, the implementation of the smoothing algorithm and determination of local extremum, such as a local maximum is described. FIG. 7 is a plot of smoothed and normalized power train data. The data 400 has been smoothed and normalized by a reference value such that it ranges from 0 to 1. The data 400 is plotted as a function of time. Raw normalized is shown as a series of points 410. The smoothed data is represented as a curve 412. However, a curve fit of the data is not required and the smoothed data can consist of a series of points stored in memory.

As the local maximum 406 is approached from the left, the three most recent first derivatives 404 at any time are likely to be greater or equal to zero. Thus, the value of local maximum stored by the SCU will increase as the last value of the local maximum is replaced with the current value of the local maximum each time three positive or zero first derivatives are detected. When the data begins to decrease near the local maximum, at some point, the three most recent local derivatives will no longer be positive and the last value of the local maximum will be retained while the data decreases in value. A different criterion, such as the four or two most recent derivatives greater than zero, can be used to determine a local maximum and use of three is presented for the purposes of illustration only.

At each time, a change from local maximum can be calculated. The change will increase until the data begins to increase again and three local derivatives again become positive at this time the local maximum is reset and the change from the local maximum at the next time step will be small. For the curve shown in FIG. 7, the largest change from the local maximum is represented approximately by change 408. The value of change 408 can be compared to a threshold value to determine if a sufficient drop in the pedal position or the calculated load has occurred (separate curves can be generated for each variable). If the threshold value is exceeded than a control command to change the displacement mode can be sent from the SCU to the vehicle.

Inhibiting Reduced Displacement Operation

Most of the embodiments described above facilitate improving fuel economy under certain operating conditions. While fuel economy gains are desirable in many applications, there are times when drivers may become frustrated with the performance losses that are inherent with certain fuel economy related factory setting. For example, as discussed above, many variable displacement V-8 engines are configured to operate in a four cylinder mode under certain operating conditions. When there is a sudden increase in requested torque while operating in the four cylinder mode, there is often a delay in the engine's response (due in part to the time required to switch back into 8-cylinder mode)—which is annoying to some drivers. Thus, in some circumstance a driver may wish to disable variable displacement operation such that the engine always remains in 8-cylinder mode. The SCU can readily be configured to cause the engine to stay in an all cylinder operational mode all of the time.

Referring next to FIG. 8, a method 500 of preventing a variable displacement engine from entering a partial displacement mode using an aftermarket device such as an SCU arranged to plug into an OBD-II diagnostics port will be described. The method starts at 501 where a determination is made as to whether the engine is currently running. This check is made simply to insure that the SCU does not send operational commands while the engine is off that could be misinterpreted by the ECU or other controller connected to the CAN bus and/or could cause to an undesirable drain on the battery. If the engine is not running, the routine simply waits until the engine is started or a determination is made that the engine is operating. The determination of whether the engine is running can be made in a number of ways. For example, one approach would be to determine whether the engine speed is greater than some minimum threshold RPM—such as 100 RPM. If that minimum threshold is not exceeded, then it may be assumed that the engine is not running. Of course, there are a number of other approaches that can be used to determine whether the engine is running.

If the engine is determined to be operating at 501, then at 503 a command is sent to the ECU to requesting that the ECU engine run in the full displacement (i.e., all cylinder operating mode (e.g., an eight cylinder operational mode in an 8-cylinder engine). In general, upon receiving the all cylinder operation command, the ECU will remain in the all cylinder mode. If for any reason the ECU had been contemplating a change to a lower displacement that potential change would be aborted thereby keeping the engine in the all cylinder mode. After the all cylinder operation command has been sent, the logic waits for a designated time at 505 and then returns to step 501 where it is verified that the engine is still running and the process is repeated as long as the engine continues to operate.

The appropriate length of delay 505 will vary based on the control characteristics of the ECU. By way of example, some commercially available variable displacement engines take something on the order of a quarter second or 300 milliseconds (ms) to institute a conversion from a full displacement mode to a partial displacement mode. In such an example, a delay on the order of 100-150 ms (as for example about 110 ms) might be appropriate to both: (a) insure that the engine always stays in the full displacement mode and doesn't begin actually changing operational parameters in preparation for such a change; and (b) not overly burden the CAM bus. Of course, the actual delay utilized in any particular application may vary widely such that the all cylinder operation command is sent as often as deemed appropriate to insure that transitions to partial displacement operating modes are precluded.

In some embodiments, the method 500 is executed any time that the ignition switch is turned on and the SCU is powered. It should be appreciated that most engines are configured to operate using all cylinders when the engine is first started. In such circumstances, the simple algorithm illustrated in FIG. 5 can effectively insure that the engine always operates in the full displacement mode. As suggested earlier, in many implementations, the control commands sent by the SCU are effectively treated as requests by the ECU so if the ECU determines that a different mode is necessary or appropriate under the circumstances, it can simply ignore the all cylinder operation mode command. Even in the unlikely event that the engine is in a partial displacement operational mode when method 500 begins execution, the all cylinder operation mode command will cause a transition to the full displacement mode.

An advantage of the described override approach is that it permits drivers to dictate the use of an engine's full displacement even in situations where the factory setting would call for partial displacement operation. For drivers whose primary interest is in performance, the ability to avert transitions to partial displacement modes at all times is highly desirable. Alternatively, as suggested earlier with respect to other embodiments, a switch or other appropriate interface can be provided to allow the driver to select the times when partial displacement operation is to be avoided.

In bus protocols that facilitate acknowledgement of the acceptance or execution of a command, the logic can verify that an all cylinder operational mode command is accepted after a command is sent (503). If no acknowledgement is received, the SCU logic can resend the command. If the command is refused (with or without an explanation of the refusal), the logic can also be arranged to determine whether sending a follow-up command is warranted.

In still other embodiments, if the ECU is arranged to transmit a notification of an impending transition to a partial displacement mode on the CAN bus, the SCU can be arranged to detect such transmissions and in response transmit an all cylinder operation mode command to prevent the transition.

A potential drawback of the simple approach illustrated described with respect to FIG. 8 is that full displacement operation commands are repeatedly sent, even when there is little or no realistic chance that the ECU will transition the engine to a 4 cylinder operation mode. This can be undesirable since it can unnecessarily interfere with the ECU's normal control, particularly when a diagnostic mode is used to control the engine operation. Therefore, when the developer of the SCU has a more sophisticated understanding of the ECU's variable displacement operation protocols, a more sophisticated SCU control algorithm can be designed that targets the transmission of full cylinder operation commands more closely to times when 4-cylinder operation would actually be possible (or likely). Some of the opportunities and advantages of such an approach are described below with reference to FIG. 9.

In the embodiment of FIG. 9, the secondary control unit (SCU) is powered up when the vehicle ignition switch is turned on (regardless of whether the engine is started) and is generally powered down when the ignition switch is turned off. Thus, the logic begins at 600 where the SCU is powered up when the ignition switch is turned on. In this embodiment a microprocessor (e.g., processor 32) in the SCU is initialized, which turns on a CAN transceiver, turns on any relevant LEDs (e.g., status indicator 36), and begins executing any appropriate power management algorithms, etc. The base processor clock, any timers, semaphores, threads and other structures are also initialized as appropriate. After the SCU is powered up and initialized, a predetermined delay 602 is imposed after which the SCU is switched to an operational mode at 604. The reason for the delay is to allow the CAN bus to settle and to help prevent causing conflicts with other devices during the power-up of other devices on the bus, etc. The length of delay can vary widely based on the needs of any particular application. By way of example, delays on the order of 5 seconds have been found to work well, although both significantly shorter and significantly longer delays can work fine in different applications. It is noted that many variable displacement engines would not consider altering the displacement for some period after initial startup under any circumstances and the delay 602 can be based on such parameters when known.

Once the SCU is in the operational mode, various logic can be employed to reduce the probability of sending operational commands when they are clearly not relevant. It should be appreciated that permissible and appropriate logic will vary widely with the protocols used by the ECU in determining when to transition into a variable displacement mode.

In the illustrated embodiment, the SCU begins monitoring selected vehicle parameters once it is operational. Typically, the SCU will send data queries to request the information it needs (step 606) and then receive the requested information (step 608). However, if some or all of the vehicle parameters of concern are readily available on the CAN bus, or otherwise available to the SCU, then there would be no need to send the corresponding requests.

In the illustrated embodiment, two of the data queries include requests for the engine speed and the vehicle speed. At 611 a determination is made as to whether the engine speed is above a designated engine speed threshold such as 300 RPM. This is largely done to try to determine whether the engine is running. Of course, the specific threshold applied can be widely varied and there are a number of alternative ways that a determination can be reliably made as to whether the engine is running.

As previously mentioned, it is generally undesirable to direct entry into a diagnostic mode or issue operational commands when an engine is not running, since such commands could cause problems with other systems. Therefore, when it is determined in step 611 that the engine is not running (e.g., the minimum engine speed is not exceeded), the logic will wait (633) a predetermined delay period before again checking to see if the engine is running at that point as long as the ignition switch remains on. If the ignition switch is turned off (631), the SCU is powered down and the process is finished.

Some variable displacement engines have a minimum vehicle speed below which the engine will not be place in a reduced displacement mode. When such constraints exist, a test can be provided to determine whether the minimum vehicle speed is exceeded. Generally, if the minimum vehicle speed is not exceeded, there is no need to direct operation in the full displacement mode since such operation is already mandated by the primary ECU control logic. In the illustrated embodiment, such a test is accomplished by step 613. The actual trigger speed will vary with vehicle design, although by way of example, some variable displacement strategies do not allow operation in a reduced cylinder mode when the vehicle speed is below something like 9 MPH and the vehicle speed threshold can trigger can be based on such characteristics.

If the vehicle speed threshold not met, then the logic returns to step 606 where the relevant data queries are resent and the threshold checking is repeated. Preferably the frequency of such information requests (pings) is limited to a reasonable frequency based upon the ECU's variable displacement control strategy. For example, in some implementations it might be appropriate to require at least 5 seconds to have passed before another information request can be sent as represented by wait block 615. Of course the appropriate time delay between monitoring requests for any particular implementation can vary widely based on the variable displacement control strategy.

It should be appreciated that there may be a variety of other specific operating conditions which are known to preclude the possibility of entrance into a reduced displacement mode. Therefore, although the only checks that are described above are engine running and vehicle speed, it should be appreciated that any number of other tests 614 could optionally be performed in addition to and/or in place of the described tests to determine times when it is unnecessary or inappropriate to direct all cylinder mode operation of the engine.

If the engine is running and the vehicle speed exceeds the minimum vehicle speed threshold (and no other tests dictate that the SCU doesn't need to or shouldn't control the vehicle displacement), a diagnostic mode command is sent to the ECU (616,617). The diagnostic mode command requests that the ECU enter a diagnostic mode where it will accept diagnostic instructions. With the ECU is in the diagnostic mode, the SCU sends a diagnostic command to the ECU instructing the ECU to stay in all cylinder operation (618). Of course, in other ECU architectures there may be no need to send a diagnostic mode command if the ECU will accept diagnostic commands without formally being in a diagnostics mode. Alternatively, if the diagnostics mode is not required in order for the ECU to accept a diagnostic command, then the step of sending the diagnostic mode command can be eliminated.

After the all cylinder operation command is sent, the logic returns to step 606 where the process is repeated after a short delay. The delay (619) is imposed so that the SCU's data queries and commands don't unnecessarily overuse the bus. Generally it is desirable to check the current operating conditions often enough so that significant changes in the operating state can be detected in a timely fashion (e.g., the vehicle stopping or the engine being turned off). Therefore, the appropriate delay will depend upon the design goals. By way of example, delays on the order of 50 to 100 milliseconds work well in some implementations although both longer and shorter delays may be used.

Some ECUs will inherently time out of the diagnostic mode after a designated period. For example, certain GM specs call for a timeout of on the order of 2-3 seconds. In such circumstances it may be desirable for the SCU to utilize a diagnostic mode timer. Then when it is determined that SCU control is appropriate (e.g., after the tests of steps 611, 613 and 614 are passed), the diagnostic mode timer may be checked to see if the engine is still in the diagnostics mode. If not, another enter diagnostic mode command can be sent as appropriate (617). In applications where the ECU protocols are such that the engine will not time out of all cylinder operation as long as the vehicle remains in diagnostic mode (or for which the timeout of the all cylinder operation is longer than the timeout for diagnostic mode), there may be no need to resend the all cylinder mode command until the diagnostic timer has expired. Of course, in other applications, the flow can be adapted in any way appropriate to properly interact with the ECU.

It is worth noting what will happen during certain operating conditions when the approach described with respect to FIG. 6 is used. When the vehicle is cruising and otherwise operating in a normal manner, the SCU will periodically send commands to stay in (or enter) diagnostics mode and to operate in the all cylinder mode, thereby insuring all cylinder operation during normal operation. When the driver comes to a stop (or slows below the minimum vehicle speed threshold) with the engine still running (a "no" decision in step 613), the SCU will stop sending diagnostic mode and all cylinder operation commands which allows the diagnostics mode to "lapse." The ping rate for sending data queries may also be reduced as appropriate for the situation in order to stay unobtrusive on the bus. The actual delay between data queries (615) will vary with the variable displacement strategy employed by the ECU, but by way of examples delays on the order of 5-10 seconds are suitable for some implementations. If the vehicle is stopped and the RPM drops below the minimum threshold but the ignition remains on, then it may be possible to reduce the ping rate even further. That is the delay imposed by step 622 may be longer. By way of example, delays on the order of 15-20 seconds may be appropriate, although again, both longer and shorter delays may be used in specific applications.

In some embodiments, there may be no reliable way to determine whether the ignition key is turned "on" or "off". In such circumstances, where it is determined that the vehicle is no longer running, it may be desirable to transition the SCU to a sleep state and set a wake-up timer at an appropriate period (e.g., 15 seconds, etc.). In the sleep mode, unnecessary components of the SCU may be shut down to conserve power and the CAN transceiver may be placed in a listen only mode. When the wake-up timer expires, the SCU may be woken up and a check may be made to determine whether the vehicle has been turned back on. This may be accomplished by checking engine speed. If no answer I is received back, or an engine speed of zero (0) is received, then the SCU is put back to sleep. Alternatively, if it is determined that the engine is running, the SCU may be placed back in a full operational mode and the logic transitioned to step 604 where the operational mode is entered.

Other Modes

In addition to the use of partial displacement operating modes, there are other factory fuel economy settings that some users find bothersome. For example, some manufacturers turn off the engine when the car is at rest (as for example when the car is stopped at a stoplight). When this occurs, the engine is supposed to quickly restart when there is a torque request (e.g., when the driver depresses the accelerator pedal). Unfortunately, there are typically delays between the time when the driver depresses the accelerator pedal and when additional torque is available due to the inherent delays associated with restarting the engine, etc. Some, but not all, manufactures provide an override switch that allows users to deactivate the start/stop functionality. For models that don't have a manufacture installed override switch, the SCU can be programmed to provide such functionality. Such a start/stop override can be automatic, or in response to a user input as described above.

There are a wide variety of other functionalities that can be provided by the SCU. For example, some vehicles incorporate a "hill holding" feature in which a parking brake is electronically set in selected circumstances (e.g., when a vehicle is stopped generally or when the vehicle is stopped on a hill). The SCU can be configured to implement a hill holding in vehicles that don't have such a capability, or it may be configured to override the hill holding feature (e.g., override the automatic setting of the parking brake in certain circumstances)—as may be particularly desirable in vehicles that provide a hill holding feature in conjunction with a start/stop feature in order to prevent the vehicle from sliding backwards when the engine is stopped.

Many of the examples given above relate to control of the engine—however the SCU can be configured to communicate with any controller configured to communicate on the CAN bus (or any other automotive network). For example, the SCU can send instructions to a transmission controller, a body control unit or any other control unit.

Most of the embodiments described above refer to communications between an SCU and an ECU. It should be appreciated that a wide variety of devices exist that control the engine, various other powertrain components and/or various other vehicle components. Some include a component referred to by the manufacturer as an engine control unit (ECU) whereas in other vehicles the controller component directing an engine is referred to as a powertrain control module (PCM) or by some other name. In still other embodiments the engine and powertrain control functionality may be provided by multiple controllers working in parallel. It should be appreciated that the methods and devices described above can be arranged to work well with any type of power train control architecture and that the term ECU as used herein is intended to cover all such arrangements.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. An electronic device comprising:
    a housing;
    a processor and a memory disposed within the housing;
    a connector arranged to couple the electronic device to a diagnostic port associated with a vehicle having a factory engine control unit (factory ECU) that includes ECU memory and ECU control algorithms, the factory ECU being arranged to direct operation of an engine in a plurality of different displacement modes; and
    an interface that allows the processor and the memory to communicate messages to the factory ECU through the diagnostics port;
    wherein the processor is configured to send a control command message to the factory ECU while the vehicle is being driven, wherein the control command causes the factory ECU to direct operation of the vehicle in a selected one of the plurality of different displacement modes that is different than the displacement mode that the factory ECU would otherwise direct operation of the vehicle in, without requiring any modification of the factory ECU.

2. The electronic device of claim 1, wherein the diagnostic port is OBD-II compliant.

3. The electronic device of claim 1, wherein the diagnostic port is JOBD or EOBD compliant.

4. The electronic device of claim 1, wherein the electronic device is a dongle configured to receive power from the diagnostic port.

5. The electronic device of claim 1, further comprising: a power source disposed within the housing for delivering power to operate the processor and wherein the electronic device is a dongle.

6. The electronic device of claim 1, wherein:
the vehicle includes a variable displacement engine; and
the processor is arranged to direct the factory ECU to maintain the engine in a full displacement mode even when the factory ECU might otherwise determine that transitioning to a partial displacement operating mode is appropriate.

7. The electronic device of claim 6, wherein the processor is further configured to repeatedly issue the control command to maintain the engine in a full displacement mode while the vehicle is being driven.

8. The electronic device of claim 1, wherein the vehicle includes a variable displacement engine and wherein the control command is for changing a displacement mode of the variable displacement engine.

9. The electronic device of claim 8, wherein processor is further configured to repeatedly issue the control command to change the displacement mode of the engine while the vehicle is being driven based upon a current operational state to improve the fuel efficiency of the vehicle.

10. An electronic device comprising:
a dongle style housing;
a processor and a memory disposed within the housing;
a connector arranged to couple the electronic device to an OBD-II diagnostic port associated with a vehicle having a factory engine control unit (factory ECU) that includes factory ECU memory and factory ECU control algorithms, the OBD-II diagnostics port being coupled to a CAN compliant vehicle communications bus;
an interface that allows the processor and the memory to communicate messages to the factory ECU through the diagnostics port and the CAN compliant vehicle communications bus;
a CAN-controller; and
a CAN transceiver for sending and receiving messages on a CAN compliant vehicle communication bus through the diagnostics port; and
wherein the processor is configured to communicate using a CAN communication protocol and to send a control command to the factory ECU via the diagnostic port while the vehicle is being driven, the control command being arranged to sometimes instruct the factory ECU to direct operation of the vehicle in a first displacement mode different than a second displacement mode that the factory ECU would otherwise direct operation in at that time without requiring any modification of the factory ECU memory and without requiring any modification of the factory ECU control algorithms, and wherein both the first and second displacement modes are supported by the factory ECU.

11. A method of directing the displacement of a vehicle having a variable displacement engine and a factory engine control unit (factory ECU), the method comprising:
sending a displacement control command from a device coupled to a diagnostic port associated with the variable displacement engine to the factory engine control unit while the vehicle is being driven, wherein the displacement control command directs the factory engine control unit to cause the engine to operate at a designated displacement that is at least sometimes different than a second displacement that the factory ECU would otherwise direct operation of the vehicle in at the time the displacement control command is sent, and wherein no modification of the factory ECU are required to enable the factory ECU to direct operation at the designated displacement, and wherein both the designated displacement and the second displacement are displacements supported by the factory ECU.

12. A method as recited in claim 11 further comprising repeatedly issuing the displacement control command during operation of the engine, wherein the displacement control command directs operation in a full displacement mode, whereby the variable displacement engine is caused to substantially always remain in the full displacement mode while the vehicle is being driven.

13. A method as recited in claim 11 wherein the displacement control command is arranged to direct operation in a partial displacement mode at a time when the engine control unit would otherwise cause the engine to operate in a full displacement operating mode.

14. A non-transitory computer readable medium suitable for use in conjunction with an automobile having a variable displacement engine and a factory engine control unit (factory ECU), the computer readable medium comprising programmed instructions configured to:
send a displacement control command from a device coupled to a diagnostic port associated with the variable displacement engine to a factory ECU while the vehicle is being driven, wherein the displacement control command directs the factory ECU to cause the engine to operate at a designated displacement that is at least sometimes different than a second displacement that the factory ECU would otherwise direct operation of the vehicle in at the time the displacement control command is sent, and wherein no modification of the factory ECU are required to enable the factory ECU to direct operation at the designated displacement, and wherein both the designated displacement and the second displacement are displacements supported by the factory ECU.

15. A computer readable medium as recited in claim 14 wherein the designated displacement directed by the displacement control command is at least sometimes different than the displacement that would otherwise be directed by the engine control unit.

16. A computer readable medium as recited in claim 14 wherein the displacement control command directs operation in a full displacement mode, whereby the variable displacement engine is caused to substantially always remain in the full displacement mode while the vehicle is being driven.

17. A computer readable medium as recited in claim 14 wherein the displacement control command is arranged to direct operation in a partial displacement mode at a time when the engine control unit would otherwise cause the engine to operate at in a full displacement operating mode.

18. A computer readable medium as recited in claim 14 wherein the programmed instructions are arranged to at least sometimes direct the engine control unit to enter a diagnostics mode and the displacement control command is sent when the engine control unit is operating in the diagnostics mode.

19. A computer readable medium as recited in claim 14 embodied in a dongle configured to be coupled to a diagnostic port.

20. A computer readable medium as recited in claim 19 wherein the diagnostic port is an OBD-II port.

21. A computer readable medium as recited in claim 14 embodied in a component configured to be coupled to a diagnostic port.

* * * * *